Dec. 21, 1954     R. B. BUCHNER     2,697,751
CIRCUIT-ARRANGEMENT FOR USE IN AUTOMATIC SIGNALING
SYSTEMS FOR SELECTIVELY TESTING THE VALUES
OF IDENTIFICATION RESISTANCES
Filed May 20, 1950     2 Sheets-Sheet 1
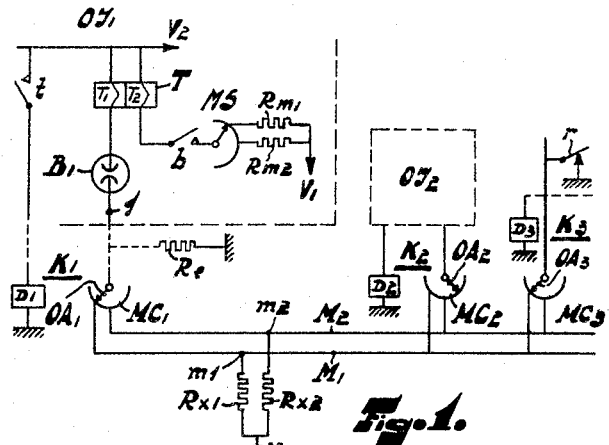
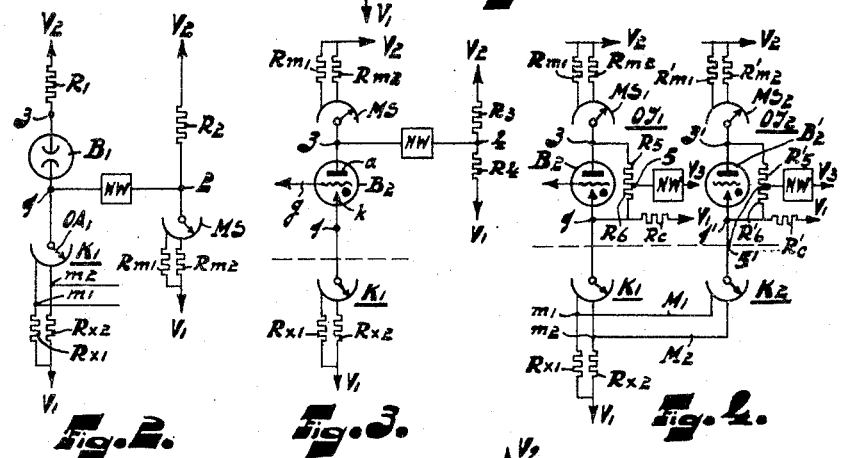
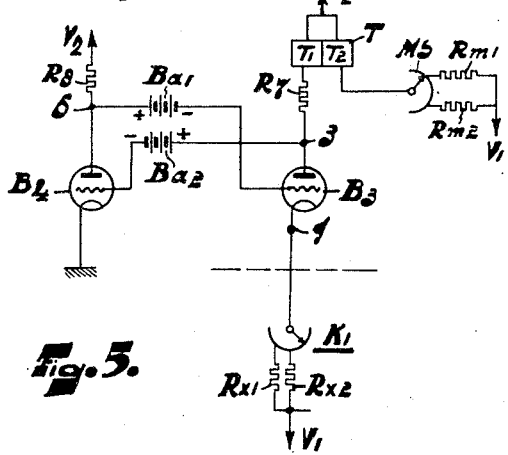
*INVENTOR.*
ROBERT BERTOLD BUCHNER
BY
AGENT

INVENTOR
ROBERT BERTOLD BUCHNER
BY
AGENT

United States Patent Office 2,697,751
Patented Dec. 21, 1954

2,697,751

CIRCUIT-ARRANGEMENT FOR USE IN AUTOMATIC SIGNALING SYSTEMS FOR SELECTIVELY TESTING THE VALUES OF IDENTIFICATION RESISTANCES

Robert Bertold Buchner, Hilversum, Netherlands, assignor to Hartford National Bank and Trust Company, Hartford, Conn., as trustee Application May 20, 1950, Serial No. 163,170

Claims priority, application Netherlands June 14, 1949

8 Claims. (Cl. 179—18)

The invention relates to circuit-arrangements for use in automatic signalling systems, for example, automatic telephony systems, for selectively testing the values of identification resistances.

Identification resistances are used to indicate, by electrical agency, definite properties or quality of outlets of selector switches, communication lines, or the like. Different properties or qualities are indicated by identification resistances of different characteristic values.

Thus, for example, in existing systems selector switches are adjusted with the use of identification resistances which are connected to marking contacts of the outlets and the resistance value of which is characteristic of the digit of the associated outlet. During the movement of a test wiper of a switch, the control-device of the switch tests the resistance values of the successive outlets, for example, by comparing these values in a bridge circuit-arrangement with a marking resistance adjusted in a register in accordance with the desired digit. As soon as an outlet is reached, of which the identification resistance bears a definite ratio to, for example, is equal to, the marking resistance, the switch is arrested.

Identification resistances may be used to make distinctions of different nature between various groups of outlets. Thus, for example, the outlets of line finder switches or final selector switches may be marked by identification resistances, which give an indication of the quality of the lines connected to the outlets, for example, the indication that a line is associated with a P. B. X-group, that connected to the line is a call-box or a prepayment coin-box, that in an existing trunk line a desired communication may be established by indirect routing.

Such selective criteria are, in general, tested after the switch has been stopped. In this case use may also be made of a bridge circuit-arrangement, in which the tested identification resistance is successively compared with various comparison resistances. The criterion may indicate, for example, that the tested identification resistance is equal to a definite comparison resistance or that the sum of identification resistance and comparison resistance has a definite value. Whatever the manner in which the test is effected, it is in any case necessary that a current should be passed through the resistance to be tested, the value of this current being directly or indirectly tested by the test circuit.

The known test circuits do not operate in a very reliable manner. Since the outlet contacts of a switch are multipled to corresponding outlet contacts of other switches, the same identification resistance is at the same time accessible to a plurality of testing devices. The same identification resistance may thus be tested at the same instant by two or more testing devices. The current flowing through the identification resistance is then distributed between the testing devices. The current flowing through the testing devices may then assume a value corresponding to the nominal value corresponding to a further identification resistance, so that the testing devices would not respond correctly. This may result, for example, in a switch being set to an unwanted outlet.

The object of the invention is to provide a circuit-arrangement in which such incorrect response is obviated.

According to the invention, a circuit-arrangement for use in automatic signalling systems for selectively testing the values of identification resistances connected at one end to a point of first potential and at the other end to an individual multiple-wired point which is connected, during the test, to the test circuit, said multiple-wired point being accessible at the same time to a plurality of test circuits and the test of a resistance taking place with the use of a direct current passing through the resistance to be tested and the multiple-wired point, is characterized in that the test circuit comprises an electronic trigger which may be in either of two different electrically stable states and which comprises at least one discharge tube, which is cut off in the first electrical state and is conductive in the second electrical state and the discharge path of which, during the test, is included in the test circuit between the multiple-wired point and a point of second potential, the trigger being brought into the first electrical state prior to the test and remaining in this state, if the multiple-wired point is found to have a potential, the difference between which and the second potential is less than a given threshold value but the discharge tube becoming conductive, if the multiple-wired point is found to have a potential, the difference between which and the second potential exceeds the given threshold value, the trigger then changing to the second electrical state and the identification resistance having a test current passing through it such that the difference between the potentials of the multiple-wired point and the second potential is reduced to a value below the given threshold value.

This circuit-arrangement consequently prevents the test current from being distributed between two or more testing devices.

The discharge tube included in the test circuit may be a gas-filled tube the striking and running voltages of which are such that the tube strikes only if no further testing device is causing a test current to pass through the identification resistance to be tested.

Use may alternatively be made of a circuit-arrangement comprising two vacuum tubes, a control-electrode of each of the tubes having a direct-current connection to a point of an output circuit of the other tube in a manner such that, when the first tube is cut off, the second tube is conductive and vice versa.

In this circuit-arrangement, one of the tubes is included in the test circuit, the cathode of this tube being connected to the identification resistance.

It should be noted that it has been proposed to use gasfilled tubes in circuits for testing whether outlets of switches are free or busy and that in the copending U. S. Patent application, Serial No. 66,679, filed December 22, 1948, a circuit is suggested for the same object, in which use is made of two vacuum tubes, the control electrodes of which are coupled to a point of an output circuit of the other tube such that, if one tube is cut off, the other tube is conductive and conversely, whilst, furthermore, the cathode of one of the tubes is connected to the test wiper of the switch. The function of such circuit-arrangements is quite different from that of the present invention and a selective test of the values of identification resistances does not take place.

In order that the invention may be more clearly understood and readily carried into effect, it will now be described in greater detail with reference to the accompanying diagrammatic drawing, in which embodiments thereof are shown, by way of example.

In the drawing, wherein like components are designated by like reference numerals:

Fig. 1 is a schematic diagram of a first preferred embodiment of the invention;

Fig. 2 is a schematic diagram of a second preferred embodiment of the invention;

Fig. 3 is a schematic diagram of a third preferred embodiment of the invention;

Fig. 4 is a schematic diagram of a fourth preferred embodiment of the invention;

Fig. 5 is a schematic diagram of a fifth preferred embodiment of the invention;

Figure 6:
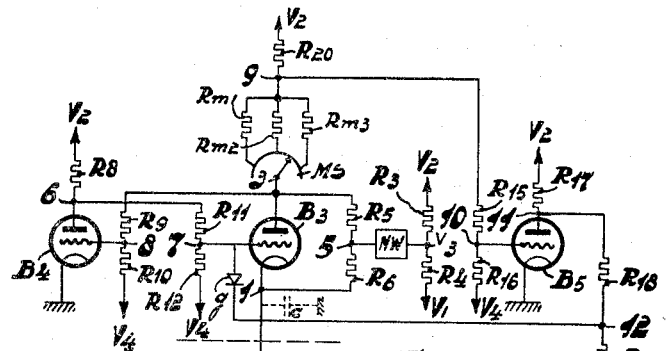
Fig. 6 is a schematic diagram of a sixth preferred embodiment of the invention.

Fig. 1 shows one embodiment of a circuit-arrangement according to the invention for the numerical adjustment of selector switches, only such elements being shown as are required for an understanding of the invention. Three selector switches $K_1$, $K_2$ and $K_3$ are shown, which may form part of a larger group of selector switches. Only the test wipers $OA_1$, $OA_2$ and $OA_3$; the banks of marking contact $MC_1$, $MC_2$ and $MC_3$ associated therewith and the rotary magnets $D_1$, $D_2$ and $D_3$ of the switches $K_1$, $K_2$ and $K_3$, respectively, are shown.

The marking contacts of corresponding outlets of the switches are multipled to one another in known manner by means of connections $M_1$, $M_2$ and so forth. Between the connections $M_1$, $M_2$ and the voltage source $V_1$ are identification resistances $R_{x1}$, $R_{x2}$, the values of which are characteristic of the digit of the corresponding outlets. The numerical adjustment of switch $K_1$ or $K_2$ is controlled by the testing devices $OI_1$ and $OI_2$, respectively.

After the switch $K_1$ is engaged, a test circuit is completed from the test wiper $OA_1$ through marking contacts and test wipers of the switches in any preceding selector stages, the discharge path of a gas-filled discharge tube $B_1$, the winding $T_1$ of a differential relay T to a voltage source $V_2$. Tube $B_1$ may, for example, be a neon tube. A marking switch MS in a register, is set to a definite position by signals emitted by a subscriber's station, for example, so that the test wiper of switch MS makes contact with a definite marking contact, which is connected to the voltage source $V_1$ through a marking resistance $R_m$, the value of which is characteristic of the digit chosen. The wiper of switch MS is connected through a contact $b$ of a relay (not shown) of the testing device $OI_1$ to one of the ends of the winding $T_2$ of the relay T. The other end of the winding $T_2$ is connected to the voltage source $V_2$. The winding of the rotary magnet $D_1$ of the switch $K_1$ is included in a circuit from earth through the winding of rotary magnet $D_1$ and the make contact $t$ of the differential relay T.

The circuit-arrangement operates as follows:

When contact $b$ closes, a circuit is completed from voltage source $V_2$ through winding $T_2$, contact $b$, wiper and marking contact of switch MS, marking resistance $R_m$ to voltage source $V_1$. The current through this circuit depends on the value of the marking resistance $R_m$ and is thus representative of the digit chosen. The relay T then becomes energized. Contact $t$ closes and results in the rotary magnet $D_1$ being energized, so that switch $K_1$ is actuated and the wiper $OA_1$ moves over the marking contacts $MC_1$.

Assuming that the outlet corresponding to the connection $M_1$ is engaged, since switch $K_3$ is set to this outlet for an existing call, the connection $M_1$ is then connected to earth potential through the test wiper $OA_3$ of the switch $K_3$ and a contact $r$ of a relay (not shown). The potential difference between $V_2$ and earth is lower than the striking voltage $V_0$ of the gasfilled tube $B_1$. Consequently, when the test wiper $OA_1$ of switch $K_1$ reaches the connection $M_1$, tube $B_1$ will not strike, winding $T_1$ of the relay T will not pass current and the switch $K_1$ continues to move. The test wiper $OA_1$ then engages a marking contact associated with the connection $M_2$, of which the associated outlet is assumed not to be engaged. The potential difference between $V_2$ and $V_1$ slightly exceeds the striking voltage $V_0$ of the tube $B_1$. When said contact is reached, the gasfilled tube $B_1$ is therefore at a voltage which exceeds the striking voltage of the tube $B_1$. Hence, tube $B_1$ strikes and a circuit is completed from voltage source $V_1$ through resistance $R_{x2}$, marking contact and test wiper of switch $K_1$, discharge path of tube $B_1$, winding $T_1$ to the voltage source $V_2$. The voltage across the gasfilled tube $B_1$ thus drops to the running voltage $V_b$.

The current through said circuit is determined by the value of the identification resistances $R_{x2}$. The values of the identification resistances $R_x$ are such that, if a test wiper reaches a desired free outlet, the currents passing through the windings $T_1$ and $T_2$ are equal. The relay T is then de-energized and the make contact $t$ opens, so that the energizing circuit of the rotary magnet $D_1$ is interrupted and the switch K stops at the desired outlet. If the marking contact of switch $K_1$ is not associated with a desired outlet, the currents passing through windings $T_1$ and $T_2$ are not equal and relay T remains energized, so that the selector switch K continues its movement. During the passage of test wiper $OA_1$ to the following marking contact, the test circuit is opened and the gasfilled tube $B_1$ extinguishes.

At a moment when the identification resistance $R_{x2}$ of switch $K_1$ is tested by the testing device $OI_1$, the selector switch $K_2$ may reach the same outlet, so that the test wiper $OA_2$ engages the connection $m_2$. At this instant, a current passes through resistance $R_{x2}$ and across the test circuit of the testing device $OI_1$, so that a voltage drop occurs across resistance $R_{x2}$ such that the difference between the potentials of the connection $m_2$ and the voltage source $V_2$ is lower than the striking voltage of the gasfilled tube in the testing device $OI_2$. This gasfilled tube consequently does not strike and the testing device $OI_2$ has no test current passing through it.

The test performed by the testing device $OI_1$ is consequently not disturbed by the parallel connection of the testing device $OI_2$, and a wrong connection is thus prevented from being established.

The circuit between the test wiper $OA_1$ and the testing device $OI_1$ may include several switches in preceding selector stages. Since the contacts of these switches are multipled to contacts of other switches, a comparatively low resistance leak to earth, represented by the leakage resistance $R_e$, may occur. An earth leak may also occur between the marking multiple connections of switch $K_1$ and earth. During the test, these leakage resistances are connected in parallel with the identification resistance and the indication may thus be inexact. The arrangement is preferably such that, during the test, the potential of the test wiper (point 1) is at least substantially equal to earth potential, the leakage resistances having no current passing through them. This may be achieved in the arrangement shown in Fig. 1, by making the potential of voltage source $V_2$ approximately equal to the running voltage $V_b$ of the gasfilled tube $B_1$ and by choosing the values of the identification resistances to be high compared with the resistance of the winding $T_1$.

The circuit-arrangement shown in Fig. 1 may be modified in a number of different ways. Thus, for example, the winding $T_1$ may be interchanged with the gasfilled tube $B_1$; the test circuit across winding $T_1$ and the comparison circuit through winding $T_2$ need not be supplied from the same voltage source.

In the circuit-arrangement shown in Fig. 1, the test current passing through winding $T_1$ is compared with the current passing through winding $T_2$, the value of which is varied by comparison resistances $R_m$. However, as an alternative, the comparison resistance $R_m$ may be connected by means of a marking switch in series with the test circuit, which includes winding $T_1$, the gasfilled tube $B_1$ and the identification resistances $R_x$, and by passing a constant comparison current through winding $T_2$ in the comparison circuit. The relay T will then release, if winding $T_1$ has the same current passing through it as winding $T_2$, that is to say if the sum of the comparison resistance $R_m$ and identification resistance $R_x$ has a definite value. In this case, the values of the comparison resistances $R_m$ must be complementary to the values of the identification resistances $R_x$. The supply voltages $V_1$ and $V_2$ are preferably chosen to be such that point 1 has earth potential when the desired outlet is reached, so that the test is not disturbed by possible earth leaks.

The disadvantage that two or more testing devices OI cannot test the same identification resistance at the same instant, is not inherent in the circuit-arrangement shown in Fig. 2 in which arrangement the series combination of one of the identification resistances $R_x$, together with the gasfilled tube $B_1$ and a fixed resistance $R_1$, and the series combination of a fixed resistance $R_2$ and the comparison resistance $R_m$ selected by the marking switch MS in accordance with the digit chosen, constitutes a Wheatstone bridge circuit-arrangement, which is supplied from the voltage sources $V_1$ and $V_2$. The diagonal of the bridge between the point 1 and a point 2 includes a voltage-comparison device NW of high input resistance. The voltage-comparison device NW serves a function analagous to relay T in Fig. 1; that is, when the voltages applied thereto are equal, it acts to arrest selector switch $K_1$. In a simple embodiment, device NW may be constituted by a dual winding relay, similar to T, each winding of which is coupled to the output of a separate vacuum tube amplifier whose inputs are connected to points 1 and 2, respectively, whereby when the applied voltages are equal, the relay acts to de-energize the magnet of the selector switch. The voltage comparison device NW may be for example, of a kind described in the copending U. S. patent application, Serial No. 107,411, filed July 29, 1949.

If the test wiper $OA_1$ of switch $K_1$ reaches a marking contact of a free outlet, of which the identification resistance is not being tested at this instant by another testing device, the gasfilled tube $B_1$ strikes and a circuit is completed from voltage supply $V_1$ through resistance $R_x$, marking contact and test wiper of switch $K_1$, point 1, tube $B_1$, resistance $R_1$ to voltage supply $V_2$. The potential of point 1 is determined by the value of the identification resistance $R_x$. As soon as a desired free outlet is reached, the potential of point 1 becomes equal to that of point 2, so that the voltage-comparison device NW responds and the switch $K_1$ is stopped by the interruption of the energizing circuit of the rotary magnet $D_1$. If, during the test of an identification resistance $R_x$ by the testing device of switch $K_1$, another switch $K$ reaches a corresponding outlet, the gasfilled tube $B$ in the testing device OI of the other switch $K$ will not strike, since owing to the current passing through the gasfilled tube $B_1$, the potential difference between voltage source $V_2$ and the marking multiple connection concerned is lower than the striking voltage of the other tube $B$. The other testing device OI has consequently no current passing through it so long as the impedance of the voltage comparison device NW is sufficiently high.

The test of the identification resistance $R_x$ by the testing device $OI_1$ of switch $K_1$ is consequently not disturbed. The voltage-testing device OI of the other switches $K$ is, however, capable of comparing the potential of the marking multiple connection with the comparison potential at point 2 of this test device $OI_1$. In this case, the test current passing through the identification resistance is not supplied by the testing device OI of the other switch $K$ itself, but by the testing device $OI_1$ of switch $K_1$.

In a modification of the circuit-arrangement shown in Fig. 2, the voltage-testing switch $K_1$ is not connected to point 1, but to a point 3. In this case, a simultaneous test by a plurality of testing devices OI is obviously impossible.

In the circuit-arrangement shown in Fig. 3, the marking switch MS is included in series with the gasfilled tube $B_2$ in the test circuit and the potential of point 3 is compared by the voltage-comparison device NW with the fixed potential of a point 4. After the gasfilled tube $B_2$ has struck, upon a free outlet not being tested by another testing device being reached, the potential of point 3 is determined by the values of the identification resistance $R_x$ and of the comparison resistance $R_m$ selected by the marking switch MS. The values of these resistances are chosen to be such that, when a desired outlet is reached, the potential of point 3 becomes equal to that of point 4.

If the comparison resistances are connected in series with the test circuit, as is shown in Fig. 3, the voltage-testing device NW must not be connected to point 1, instead of being connected to point 3, since the potential of point 1 also varies with the value of resistance $R_m$, so that the control-device OI of another switch $K$, when a corresponding outlet is reached, would not respond correctly.

In the circuit-arrangement shown in Fig. 3, the gasfilled tube $B_2$ comprises a cathode $k$, an anode $a$ and a control electrode $g$. This provides the advantage that the starting voltage of the tube may be adjusted to a given value by varying the potential of the control-electrode within certain limits.

The circuits shown in Figs. 1 to 3 have a limitation in that the test current passing through resistance $R_x$ is more or less dependent on the value of the running voltage of the gasfilled tube. This drawback is not inherent in the circuit-arrangement shown in Fig. 4 in which the marking switch MS, similarly as in the circuit-arrangement shown in Fig. 3, is connected in series with the test circuit. The gasfilled tube $B_2$ is shunted by a potentiometer $R_5$, $R_6$. Connected between the tapping point 5 of the potentiometer $R_5$, $R_6$ and a point of fixed potential $V_3$ is the voltage-testing device NW. The tapping point 5 is such that the ratio between the resistances $R_5$ and $R_6$ is equal to the ratio between a comparison resistance $R_m$ and an identification resistance $R_x$ corresponding to the same digit. If, for example, the comparison resistances and identification resistances corresponding to the same digit are equal, point 5 is at the centre of the potentiometer $R_5$, $R_6$. In this case, the voltage $V_3$ is chosen to be equal to half the sum of the voltages $V_1$ and $V_2$. The total resistances of the potentiometer $R_5$, $R_6$ must be high compared with the highest of the comparison and identification resistances.

This circuit-arrangement operates as follows: As soon as the test wiper of switch $K_1$ reaches the marking contact of a free outlet, which is not being tested by another device, the gasfilled tube $B_2$ strikes. The voltage of point 5 is then equal to $V_3 + \frac{1}{2}(R_x - R_m)I$, where I is the current passing through the test circuit. If the identification resistance $R_x$ of the tested outlet is equal to the comparison resistance $R_m$, the voltage of point 5 is equal to $V_3$, the voltage-testing device NW responds and the switch $K_1$ is stopped. In this case, the voltage of point 5 is independent of the current passing through the test circuit, i. e. does not vary with the running voltage of the gasfilled tube $B_2$, whilst, furthermore, the potential of the marking connection is independent of the value of the tested identification resistance $R_x$ because there is a fixed ratio between the comparison resistance $R_m$ and the identification resistance $R_x$ corresponding to the same digit.

The supply voltages $V_1$ and $V_2$ are preferably such that, during test, the point 1 is substantially at earth potential and in addition the voltage $V_3$ is taken from a potentiometer connected between voltage sources $V_1$ and $V_2$, so that, if the bridge is balanced, the difference between voltage $V_3$ and the potential of point 5 is independent of the supply voltages $V_1$ and $V_2$.

If the tested identification resistance $R_x$ is not equal to the comparison resistance $R_m$, the device NW does not respond and the switch $K_1$ continues its movement. If the resistances $R_x$, $R_m$ are different, the voltage of point 5 varies with the test current I, but this is not troublesome provided care is taken that the test current I is sufficiently high to produce the required voltage divergence at point 5.

In the case of a simultaneous test of the same identification resistance by two testing devices $OI_1$ and $OI_2$, the gasfilled tube of that device will strike, of which the test wiper is first to reach the marking contact concerned, for example of the testing device $OI_1$. The gasfilled tube $B^1_2$ in the other testing device $OI_2$ remains extinguished.

Since the resistance of the potentiometer $R^1_5R^1_6$ of the device $OI_2$ is high compared with the identification resistance $R_x$, the device $OI_2$ will be able to pass a low current only such that the test performed by the device $OI_1$ is not affected. The potential of point $5^1$ in the device $OI_2$ is then substantially equal to half the sum of the potential $V_2$ and the potential of the marking connection. Since the potential of the marking connection is not equal to potential $V_1$, the potential of point $5^1$ cannot be equal to potential $V_3$, because potential $V_3$ is equal to half the sum of potentials $V_1$ and $V_2$.

Neither of the devices $OI_1$ and $OI_2$ can therefore not respond correctly and a switch $K$ cannot be adjusted to give a wrong connection. The supply voltages $V_1$ and $V_2$ are preferably such that during test, point 1 is substantially at earth potential.

In order to reduce the current passing through the device $OI_2$ to zero, between point $1^1$ and voltage-source $V_1$ is connected a resistance $R^1_c$, the value of which is such that in the extinguished condition of the gasfilled tube $B^1_2$ and in the absence of current through the test wire, the potential of point $1^1$ is substantially equal to the potential of the marking connection, if a desired resistance is tested. The potential of point $1^1$ is only slightly dependent on the values of the marking resistances $R_m$, since the resistance value of the potentiometer $R^1_5R^1_6$ is high compared with the highest marking resistance.

In the circuit-arrangements described above, the trigger was constituted by a gasfilled tube. The use of a gasfilled tube has several limitations under special conditions. The striking and running voltages are not always the same for different tubes and even with the same tube they may vary in course of time. The difference between the striking voltage and the running voltage cannot be chosen arbitrarily. Once a gasfilled tube has struck, the current can at best be influenced only with difficulty with the use of a control-electrode. A further limitation is that, since the de-ionisation period is comparatively long, disturbances are liable to occur. If, for example, after the gasfilled tube has struck during a test, the test wiper of the associated switch passes to a marking contact connected to an identification resistance $R_x$, which is being tested by another testing circuit, the gasfilled tube may not have been sufficiently de-ionised during the time it takes the wiper to pass from one contact to the next, so that the striking voltage is, at that time, lower than the nominal value and the tube re-ignites.

In the embodiments of the invention to be described hereinafter, the trigger comprises two vacuum tubes, a control-electrode of each of the tubes having a direct-current connection to an output circuit of the other tube such that, when one tube is conductive, the other is cut off and vice versa.

In the circuit-arrangement shown in Fig. 5, the control-grid of tube $B_3$ and the anode of tube $B_4$ have connected between them a battery $B_{a1}$, so that the control-grid of tube $B_3$, in the conductive condition of tube $B_4$, assumes a potential of, say, −40 v. The control-grid of tube $B_4$ is connected in a similar manner through a battery $B_{a2}$ to the anode of tube $B_3$. The anode of tube $B_4$ is supplied through a resistance $R_8$ from a voltage source $V_2$, whilst the anode circuit of tube $B_3$ comprises the series combination of resistance $R_7$ and the winding $T_1$ of the differential relay T.

In the position of rest, the cathode circuit of tube $B_3$ is open so that this tube is cut off. The potential of point 3 is thus comparatively high and tube $B_4$ is conductive. When the test circuit is put into use, the cathode of tube $B_3$ is connected, in a manner not shown, to the test wiper of the switch $K_1$ and the switch is actuated. The marking contacts of switch $K_1$ are connected through the identification resistances $R_{x1}$, $R_{x2}$ to the voltage source $V_1$ supplying a potential of −60 v. As will be shown hereinafter, the potential of marking contacts of engaged outlets and of outlets being tested by another testing device OI is more positive than −40 v. (It is obvious that it is possible that busy marking may be effected with the use of separate contacts.)

If the test wiper reaches the marking contact of a busy outlet, the potential of the cathode of tube $B_3$ exceeds that of the control-grid and the tube $B_3$ remains cut off. However, if a marking contact of a free outlet or an outlet not being tested is reached, the potential of the control-grid of tube $B_3$ is positive with respect to the cathode, so that tube $B_3$ becomes conductive. Thus, if the control-grid has a fixed potential of −40 v., the potential of the cathode of tube $B_3$, due to the current passing through the identification resistance $R_x$ would increase to a value exceeding −40 v. by a few volts. In this case, the tube $B_3$ of a testing device OI of another switch K, which reached the corresponding marking contact, would also become conductive and hence a simultaneous but an incorrect response might take place, since, however, the tube $B_3$ becomes conductive, the potential of point 3 drops so that tube $B_4$ is cut off. The potential of the cathode of tube $B_3$ is thus increased substantially to earth potential. The tube $B_3$ thus becomes conductive within a very short time interval. Thus, if another switch reaches a corresponding outlet, the test wiper of switch K finds on the marking contact a potential which is highly positive with respect to that of the control-grid of tube $B_3$ of the associated test circuit, so that the tube B associated with the other switch K remains cut off and this testing circuit OI cannot cause current to pass through the identification resistance $R_x$, the test by the first test circuit thus not being disturbed.

The value of the current passing through the identification resistance $R_x$ is equal to the value of the potential difference between the cathode of the tube $B_3$ and the potential of voltage source $V_1$ divided by the value of the identification resistance $R_x$. The same current passes through the winding $T_1$. If this is equal to the current passing through the second winding $T_2$, the relay T releases and the movement of the switch $K_1$ is stopped. If the outlet tested is found not to be a desired outlet, the switch $K_1$ continues its movement. During the passage of the test wiper of switch $K_1$ to the next following contact, the cathode circuit of tube $B_3$ is interrupted and tube $B_3$ is again cut off.

By a suitable choice of the supply voltages and of the potential of the cathode of tube $B_4$, either of the batteries $B_{a1}$ and $B_{a2}$ may be dispensed with and the control-grid of one of the tubes may be connected directly to the anode or to a point of the anode circuit of the other tube. The use of batteries to obtain the desired voltage difference between control-grid and anode is not practical, since the batteries have a fluctuating potential and each testing device OI requires separate batteries.

Figure 7:
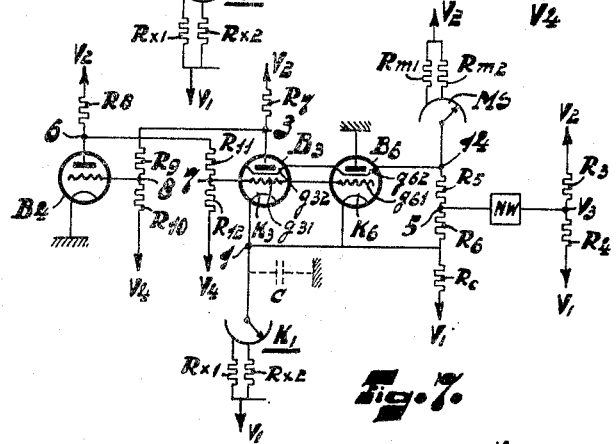
Fig. 7 is a schematic diagram of a seventh preferred embodiment of the invention.
Figure 8:
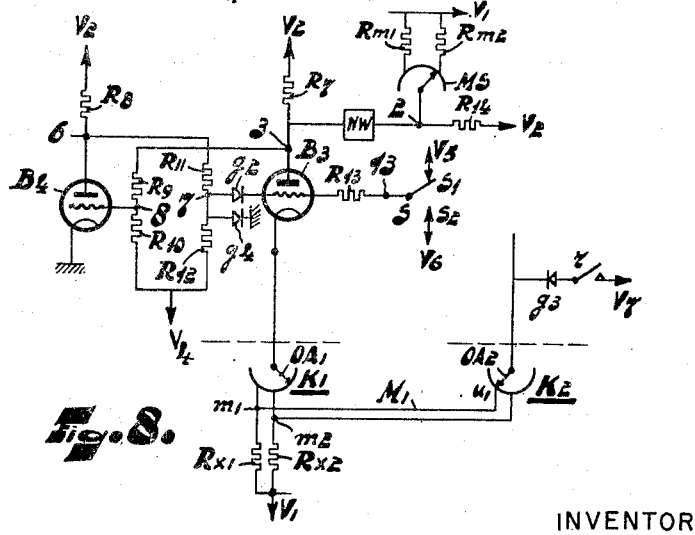
Fig. 8 is a schematic diagram of an eighth preferred embodiment of the invention.

Use is, therefore, preferably made of any of the circuit-arrangements shown in Figs. 6 to 8, the control-grid of tube $B_3$ being connected to a tapping 7 of a potentiometer $R_{11}$, $R_{12}$ connected between the anode of tube $B_4$ and voltage supply point $V_4$. The point $V_4$ has a negative potential, the voltage drop across resistance $R_{11}$ replacing the voltage of battery $B_{a1}$ of Fig. 5. By a suitable choice of the tapping 7, the potential of tube $B_3$ may be adjusted to the desired value.

The control-grid of tube $B_4$ is similarly connected to a tapping 8 of a potentiometer $R_9$, $R_{10}$. The trigger circuit otherwise operates in a manner entirely similar to that of Fig. 5.

In the arrangement shown in Fig. 6 the test of the identification resistance is effected in a manner similar to that described with reference to Fig. 4. The anode of tube $B_3$ is connected to the wiper of the register marking switch MS. The register marking resistances $R_m$ are connected at one end to the contacts of the marking switch MS and at the other end, through a common point 9 and a resistance $R_{20}$ to the voltage source $V_2$. The function of resistance $R_{20}$ will be explained hereinafter. Tube $B_3$ is shunted by the potentiometer $R_5$, $R_6$. The total resistance of each of the potentiometers $R_9$, $R_{10}$ and $R_5$, $R_6$ is preferably high compared with the highest values of the series combination of one of the resistances $R_m$ and the resistance $R_{20}$, so that substantially the same current passes through a marking resistance $R_m$ and an identification resistance $R_x$.

The voltage-testing device NW compares the voltage of point 5 on the potentiometer $R_5$, $R_6$ with the fixed potential $V_3$. This device responds if, upon reaching a desired outlet, the potential of point 5 has a definite ratio to, for example is equal to, the potential $V_3$.

Point 5 is furthermore chosen to be such that the potential of this point does not vary with the current passing through tube $B_3$, if the wiper of the switch K is in contact with the marking contact of a desired outlet, that is to say that the relation $$(R_{20}+R_m)/R_x = R_5/R_6$$

must be fulfilled, if $R_m$ and $R_x$ are associated values of marking resistance and identification resistance.

The potential $V_3$ must be equal to $$(R_6 V_2 + R_5 V_1)/(R_5 + R_6)$$

if, assuming the correct adjustment of switch $K_1$, voltage $V_3$ is equal to the potential of point 5.

Fig. 6 furthermore illustrates a measure which may also be taken, if desired, to modify the circuit-arrangements shown in Figs. 5, 7 and 8. This measure has for its object to neutralize the disturbing effect of any leakage resistance ($R_1$ of Fig. 1) from the test conductor to earth, by providing that the cathode lead of tube $B_3$ in the conductive condition is kept at earth potential.

For this purpose, the circuit-arrangement comprises a tube $B_5$, of which a control-electrode is connected to point 10 of a potentiometer $R_{15}$, $R_{16}$ connected between point 9 and the voltage source $V_4$. The anode of tube $B_5$ is fed through a resistance $R_{17}$. The control-grid of tube $B_3$ is furthermore connected through a rectifier g to tapping 12 of a potentiometer $R_{18}$, $R_{19}$ connected between the anode of tube $B_5$ and voltage source $V_4$.

The rectifier g is not conductive in the stable state of the circuit and becomes conductive as soon as the circuit passes to its second electrical condition, that is to say the condition in which tube $B_3$ is conductive.

If the value of the resistance $R_x$ included in the cathode circuit is decreased, the current passing through the test conductor and resistance $R_{20}$ increases. The potential of point 10 is thus decreased and that of point 12 and of the control-grid of tube $B_3$ increased. If the control-grid of tube $B_3$ has a fixed potential, a decrease of the cathode resistance would result in a decrease in potential of the cathode of tube $B_3$. The back-coupling to the grid of tube $B_3$ is adjusted in a manner such that the decrease in cathode potential is exactly compensated by the effect of the increase in potential of the control-grid. The (differential) input resistance of the test circuit is thus exactly zero, that is to say a variation of the current passing through the circuit does not result in variation of the potential at point 1. Calculation shows that in these circumstances, the regenerative circuit formed by the tubes $B_3$ and $B_5$ must be adjusted to the limit of self-oscillation, in the absence of a resistance in the cathode circuit of tube $B_3$, for example, in the case of direct connection of point 1 to earth.

With an identification resistance $R_x$ in the cathode lead of tube $B_3$, the arrangement is naturally stable.

Point 12 is further chosen to be such that the cathode of tube $B_3$ is at earth potential.

The wiring capacity C related to the test conductor (point 1) constitutes a disturbing factor if identification resistances $R_x$ are required to be tested in rapid succession, for example, if high-speed selector switches are used. This capacity may assume a comparatively high value (for example of the order of $10^4$ pF) if the test is effected through switches in a number of preceding cascade-connected selector stages, since the marking multipled connections of these switches remain connected to the test conductor.

The capacity C delays the passage of the trigger from its first to its second electrical condition. At the instant when tube $B_3$ becomes conductive, point 1 is at a negative potential and the capacity C is consequently negatively charged. Since tube $B_3$ becomes conductive, C becomes discharged through the discharge path of tube $B_3$ and the resistances $R_m$ and $R_{20}$. The presence of the comparatively high resistances in this circuit limits the discharge current.

This may result in that the process ensues so slowly that the device NW responds incorrectly, whilst it remains possible that a simultaneous test may be performed by two test circuits with spurious results. Furthermore, the time during which the voltage test can be carried out by the device NW is shortened.

Fig. 7 shows a circuit-arrangement, which permits of materially reducing the disturbing effect of capacity C, the trigger circuit being arranged in a manner similar to that of Figs. 5 and 6. Tube $B_3$, however, comprises a screen grid. The anode circuit of tube $B_3$ includes a resistance $R_7$. The control grids of the tubes $B_3$ and $B_4$ are connected with the use of potentiometers $R_{11}$, $R_{12}$ and $R_9$, $R_{10}$, respectively, to the anode of the other tube, in a manner similar to that shown in Fig. 6.

The circuit includes in addition, an auxiliary tube $B_6$, which, similarly to tube $B_3$, is a screen-grid tube. The cathode $K_6$ of tube $B_6$, the screen grid $g_{32}$ of tube $B_3$ and the screen-grid $g_{62}$ of tube $B_6$ are connected to the cathode $K_3$. The control-grids $g_{31}$ of tube $B_3$ and $g_{61}$ of tube $B_6$ are connected together.

The anode of tube $B_6$ is connected to earth.

The discharge paths between cathode and screen-grid of tubes $B_3$ and $B_6$ are connected in parallel in the test circuit proper, i. e., as will be seen hereinafter, during the test substantially the whole of the test current passes through these discharge paths.

The potentiometer $R_5$, $R_6$ is connected between the cathodes and the screen-grids. The voltage-testing device NW compares, similarly as in the circuit of Fig. 6, the potential of point 5 of this potentiometer with the fixed potential $V_3$ determined by the potentiometer $R_3$, $R_4$. The screen-grids are furthermore connected to the supply point $V_2$ through a comparison resistance $R_m$ connected into circuit by the marking switch MS. Connected between the cathodes of tube $B_3$ and tube $B_6$ and supply $V_1$ is a resistance $R_c$, the function of which is similar to that of the resistance $R_c$ in the circuit shown in Fig. 4.

During the test of an identification resistance $R_x$, point 1 is substantially at earth potential and the capacity C of the test conductor is consequently uncharged. As the test wiper of switch $K_1$ passes from one marking contact to the next, the test conductor is interrupted for a short period, so that tubes $B_3$ and $B_6$ are cut off and tube $B_4$ becomes conductive, so that the trigger circuit comprising tubes $B_3$, $B_4$ passes to the first electrical condition.

After the test wiper of switch $K_1$ has engaged the next marking contact, the capacity is negatively charged through the identification resistance $R_x$ connected into circuit, until point 1 is at a potential relative to the control-grid $g_{31}$ of tube $B_3$ such that the tubes $B_3$ and $B_6$ become conductive. Owing to the voltage drop at the anode of tube $B_3$, tube $B_4$ is cut off and the potential of the control-grids of tubes $B_3$ and $B_6$ is increased approximately to earth potential, that is to say a value which is greatly positive relative to the potential of the cathodes $K_3$, $K_6$.

Tubes $B_3$ and $B_6$ have consequently passing through them a strong current, which rapidly discharges the capacity C.

The major part of this current passes, during this period, through the anode of tube $B_6$, since the currents through the anode circuit of tube $B_3$ and the screen-grids of tubes $B_3$ and $B_6$ are limited by the resistances $R_7$ and $R_m$.

After the potential of point 1 has increased to approximately earth potential, the current through tube $B_6$ drops to zero, because the potential of the anode drops below that of the cathode. The potential of point 1 then increases further to a slight extent, until the final value is reached.

Substantially the whole of the test current passing through the identification resistance $R_x$ thus flows through the screen-grids of the tubes $B_3$ and $B_6$. The resistance $R_7$ included in the anode circuit of tube $B_3$ has a high value such that the potential of the anode of tube $B_3$ is but little higher than that of the cathode. The current passing through this resistance is, consequently, very low and moreover substantially independent of the included identification resistance $R_x$ (the potential of the cathodes of the tubes $B_3$ and $B_6$ varies but little), so that this current can be compensated by the current passing through the resistance $R_c$.

The circuit elements are furthermore chosen to be such that, as already explained with reference to Fig. 4, in the first electrical condition of the trigger circuit, due to the voltage distribution to potentiometer $R_5$, $R_6$ and resistance $R_c$, the potential of point 1 is substantially equal to the potential of point 1 during test, so that no current will pass through the test circuit if it is connected to the multiple-wired point associated with an identification resistance which at that instant is tested by another testing device OI.

The provision of resistance $R_c$ has a further advantage, since in the absence of the resistance the potential of point 1 would increase to $V_2$ in the first electrical condition of the trigger circuit. In this case, after the test wiper has reached a marking contact, the capacity C would take much longer to become charged to a negtaive value such that the tube $B_3$ would become conductive.

Fig. 8 shows a circuit-arrangement for numerical adjustment of a selector switch K, for example, a final selector switch, which permits of cutting in on an existing call, that is to say of testing the value of an identification resistance of a busy outlet, the busy criterion being given to the same marking contact as is used for the numerical resistance marking.

The control-grid of tube $B_3$ is here connected through a rectifier $g_2$ to the tapping 7 on the potentiometer $R_{11}$, $R_{12}$. In the position $S_1$ of switch S the control grid is also connected through resistance $R_{13}$, to voltage source $V_5$ and in the position $S_2$ of switch S, through resistance $R_{13}$ to voltage source $V_6$. The connection of the control-grid to points 7 and 13 is such that the control-grid assumes the higher of the potentials of these points. If, for example, the potential of point 7 exceeds that of point 13, the rectifier $g_2$ is conductive and constitutes a low resistance relative to resistance $R_{13}$. If, on the contrary, the potential of point 7 is lower than that of point 13, the rectifier constitutes a high resistance relative to $R_{13}$. The same object is attained, if rectifier $g_2$ and resistance $R_{13}$ are interchanged.

The potential $V_5$ may be $-40$ v., and the potential $V_6$, $-20$ v. Thus, in the condition of the circuit in which tube $B_4$ is conductive, the potential of point 7 is $-40$ v. In the stable state, the potential of the control-grid of tube $B_3$ is, consequently, determined by that of point 13. A rectifier $g_4$ connected between point 7 and earth is cut off in this condition. The switch S normally occupies the position $S_1$.

If the wiper $OA_1$ reaches a marking contact of a free outlet, tube $B_3$ becomes conductive, in the manner described above, and tube $B_4$ is cut off. The rectifier $g_2$ now becomes conductive and the potential of the control-grid of tube $B_3$ is determined by that of point 7. The potential of point 7 increases to such an extent that rectifier $g_4$ also becomes conductive. The potential of the control-grid of tube $B_3$ thus becomes equal to earth potential and is, consequently, not affected by any divergences of the values of the resistances $R_8$, $R_{11}$, $R_{12}$, or by variations in the potentials of sources $V_2$ or $V_4$.

The voltage-testing device NW compares the potentials of point 3 in the test circuit and of point 2 in the comparison circuit $R_{14}$, $R_m$. As soon as a desired value is reached, the device NW responds. Assuming now that a call is established through the outlet $U_1$ of switch $K_2$, the multipled marking conductor $M_1$ of this outlet being consequently connected through marking contact and wiper $OA_2$ of switch $K_2$, rectifier $g_3$ and the closed contact $r$ of a relay (not shown) to the voltage source $V_7$, the potential of which is, for example, $-25$ v.

If the wiper $OA_1$ of switch $K_1$ now reaches this outlet, tube $B_3$ would not become conductive, since the control-grid has a potential which is 15 v. lower than that of the cathode. Consequently the switch moves on.

If the operator desires to cut in on the existing call, switch S is moved to position $S_2$, with the result that the control-grid of tube $B_3$ assumes a potential of $-20$ v. The threshold value of the trigger is thus lowered. Thus, if the wiper $OA_1$ reaches the engaged outlet, the potential of the control-grid of tube $B_3$ exceeds that of the cathode, tube $B_3$ becomes conductive and the trigger passes to the second electrical stable state.

The potential of the cathode of $B_3$ is thus slightly increased over earth potential, so that rectifier $g_3$ is cut off and the busy-marking circuit of switch $K_2$ does not constitute a load on the multipled marking conductor $M_1$. The test of the identification resistance $R_{x1}$ is consequently further carried out in the manner similar to that for a free outlet.

What I claim is:

1. An automatic signalling system comprising a plurality of selector switches each provided with a series of contacts and an arm for successively engaging said contacts, the corresponding contacts of said switches being multipled, a like series of identification resistors of different value each connected between a respective multipled contact and a common first point of potential; and a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit.

2. An automatic signalling system comprising a plurality of selector switches each provided with a series of contacts, an arm successively engaging said contacts, and electromagnetic means actuating said arm, the corresponding contacts of said switches being multipled; a like series of identification resistors of different value each connected between a respective multipled contact and a common first point of potential; a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit; and means coupled to said trigger and responsive to current flow in the engaged identification resistor to arrest said electromagnetic means when said current flow attains a given value.

3. An automatic signalling system comprising a plurality of selector switches each provided with a series of contacts, an arm successively engaging said contacts, and electromagnetic means actuating said arm, the corresponding contacts of said switches being multipled; a like series of identification resistors of different value each connected between a respective multipled contact and a common first point of potential; a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit; a marking switch having a succession of contacts and a brush for successively engaging said contacts; a like succession of marking resistances each connected between said common first point of potential and a respective contact of said marking switch; and a dual-winding relay including a contact switch, one of said windings being connected between said brush and said second point of potential, the other winding being interposed between said tube and said second point of potential, said contact switch being interposed in the circuit of said electromagnetic means, said relay operating to arrest said selector switch when the currents through said windings are substantially equal.

4. An automatic signalling system comprising a plurality of selector switches each provided with a series of contacts, an arm successively engaging said contacts, and electromagnetic means actuating said arm, the corresponding contacts of said switches being multipled; a like series of identification resistors of different value each connected between a respective multipled contact and a common first point of potential; a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit; a marking switch having a succession of contacts and a brush for successively engaging said contacts; a like succession of marking resistances each connected between said common first point of potential and a respective contact of said marking switch; a first balancing resistance interposed between said tube and said second point of potential, a second balancing resistance connecting said brush to said second point of potential, and a voltage comparison device connected between the arm of said selector switch and the brush of said marking switch and including control means coupled to said arm and said brush and provided with means rendered operative when the potentials at said arm and brush are equal and means operatively connected to said control means and coupled to said electromagnetic means to arrest said selector switch when said control means is operative.

5. An automatic signalling system comprising a plurality of selector switches each provided with a series of contacts, an arm successively engaging said contacts, and electromagnetic means actuating said arm, the corresponding contacts of said switches being multipled; a like series of identification resistors of different value each connected between a respective contact and a common first point of potential; a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit; a marking switch having a succession of contacts and a brush for engaging said contacts; a like succession of marking resistances, said marking switch in series with said marking resistances being interposed between said tube and said second point of potential, each of said second resistances being connected between said second point and a respective contact of said marking switch; a potentiometer connected between said first and second points of potential and having a tap, and a voltage comparison device connected between said brush and said tap and including control means coupled to said arm and said brush and provided with means rendered operative when the potentials at said tap and brush are equal and means operatively connected to said control means and coupled to said electromagnetic means to arrest said selector switch when said control means is operative.

6. A system, as set forth in claim 5, wherein said discharge tube is gaseous and includes a control electrode, and further including means connecting said control electrode to a voltage source to determine said threshold value.

7. An automatic signalling system comprising a plurality of selector switches each provided with a series of contacts and an arm for successively engaging said contacts, the corresponding contacts of said switches being multipled, a like series of identification resistors of different value each connected between a respective multipled contact and a common first point of potential; and a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit, said tube being constituted by a cathode, a grid and an anode, said cathode being connected to said arm, said anode being connected to said second point of potential, a first anode resistance interposed between said anode and said second point, a second discharge tube having a cathode, a grid and an anode, a second anode resistance connecting the anode of said second tube to said second point of potential, said cathode of said second tube being at ground potential, means connecting for direct-current said anode of said second tube to the grid of the first tube and the grid of the first tube to the anode of the second tube whereby when said first tube is rendered non-conductive said second tube is conductive, and vice versa.

8. An automatic signalling system comprising a plurality of selector switches each provided with a series of contacts and an arm for successively engaging said contacts, the corresponding contacts of said switches being multipled, a like series of identification resistors of different value each connected between a respective multipled contact and a common first point of potential; and a testing circuit associated with each switch for testing the potential drop developed across an engaged identification resistor, said testing circuit including an electronic trigger provided with an electron discharge tube, said trigger having a first stable state in which said tube is non-conductive, and in response to an applied potential exceeding a predetermined threshold value entering into a second stable state in which said tube is conductive, means connecting the discharge path of said tube between the arm of the associated switch and a point of second potential having a predetermined value relative to said first point of potential and said threshold value such that when an engaged contact of the associated switch is found to have a potential the difference between which and said second potential is below said threshold value, said trigger remains in said first state, but when said difference potential exceeds said threshold value said trigger enters said second state wherein said tube conducts to pass a test current effecting a reduction in said difference potential below said threshold value, whereby a testing circuit associated with another selector switch will not react to the multipled contact engaged by the operative testing circuit; second and third electron discharge tubes, all of said tubes including a cathode, a grid and an anode, said first and third tubes further including a screen grid, the cathode of the first tube being connected to said selector arm and the anode thereof being connected to said second point of potential, a first anode resistance connected between said anode of the first tube and said second point, a second anode resistance connecting the anode of said second tube to said second point, the cathode thereof being connected to ground potential, means connecting for direct-current said anode of said second tube to the grid of the first tube and the grid of the first tube to the anode of the second tube whereby when the first tube is conductive the second is non-conductive and vice-versa, means interconnecting the cathodes, the grids and the screen grids of said first and third tubes, and means connecting the anode of the third tube to a point of potential such that during the change of the trigger from the first to the second state the anode of the third tube passes current but in the second state the whole of the emission current flows to the screen grid of said third tube.

References Cited in the file of this patent

UNITED STATES PATENTS

| Number | Name | Date |
|---|---|---|
| 2,354,668 | Deakin et al. | Aug. 1, 1944 |
| 2,444,065 | Pouliart | June 29, 1948 |
| 2,454,781 | Deakin | Nov. 30, 1948 |
| 2,462,074 | Deakin et al. | Feb. 22, 1949 |
| 2,559,601 | Deakin | July 10, 1951 |